(12) United States Patent
Wedl

(10) Patent No.: US 11,752,455 B2
(45) Date of Patent: Sep. 12, 2023

(54) VIBRATING PAINT STRAINER STAND

(71) Applicant: Nathan A. Wedl, Jefferson, WI (US)

(72) Inventor: Nathan A. Wedl, Jefferson, WI (US)

( * ) Notice: Subject to any disclaimer, the term of this patent is extended or adjusted under 35 U.S.C. 154(b) by 135 days.

(21) Appl. No.: 17/369,716

(22) Filed: Jul. 7, 2021

(65) Prior Publication Data

US 2022/0008847 A1 Jan. 13, 2022

Related U.S. Application Data

(60) Provisional application No. 63/048,900, filed on Jul. 7, 2020.

(51) Int. Cl.
*B01D 33/03* (2006.01)
*B01D 33/80* (2006.01)
*B01D 35/20* (2006.01)

(52) U.S. Cl.
CPC ....... *B01D 33/0307* (2013.01); *B01D 33/801* (2013.01); *B01D 35/20* (2013.01); *B01D 2201/0415* (2013.01)

(58) Field of Classification Search
CPC .. B01D 33/0307; B01D 33/801; B01D 35/20; B01D 2201/0415; B01D 2201/04; B05B 15/20; B05B 15/40
See application file for complete search history.

(56) References Cited

U.S. PATENT DOCUMENTS

| D280,685 S | 9/1985 | Whelan | |
|---|---|---|---|
| 4,619,532 A * | 10/1986 | Schmidt, III | ......... B01F 31/265 |
| | | | D15/147 |
| 4,804,470 A | 2/1989 | Calvillo et al. | |
| D304,670 S | 11/1989 | Johnson | |
| 2006/0002228 A1 * | 1/2006 | Schulz | .................. B01F 29/10 |
| | | | 366/217 |

OTHER PUBLICATIONS

"20GSFTR-14NC Electric Sifter/Sieve for 20-Gallon Brute, without Trash Can—# 14 Mesh, for Flour." Bakedeco.com. https://www.bakedeco.com/detail.asp?id=47461&trng=fgle&gclid=CjwKCAjwpv0BRABEiwA-TySwQJxSpwTW_kcWDNOHST4r3MncCHk6N2WxyEos0MsrFKUwIW-V8XbOxoCXbYQAvD_BwE [date accessed: Apr. 14, 2020].
"Electrostatic Powder Screening 6-600mesh Sifting Machine Electric Powder Sieve Machine Rotating Vibration Sieve Powder Machine." AliExpress. https://www.aliexpress.com/item/32829909241.html [date accessed: Apr. 14, 2020].

* cited by examiner

*Primary Examiner* — Waqaas Ali
(74) *Attorney, Agent, or Firm* — Christopher Mayle; BOLD IP, PLLC

(57) ABSTRACT

A system and method for a vibrating paint strainer stand that enables the user to effectuate the flow of paint through a paint strainer by vibration whereby the paint strainer is positioned in a paint strainer holder on the stand such that one or more vibration motors attached on a neck opposite of the holder can provide vibration to the paint strainer.

8 Claims, 6 Drawing Sheets

VIBRATING PAINT STRAINER STAND

CROSS REFERENCE TO RELATED APPLICATIONS

This application is a non-provisional patent application that claims priority to U.S. provisional application 63/048,900 filed on Jul. 7, 2020.

FIELD OF THE DISCLOSURE

This invention relates to a paint strainer stand. Specifically, the invention describes a paint strainer stand capable of vibrating to effectuate the flow of paint through a paint strainer.

BACKGROUND

Today, a majority of paints used are comprised of mixtures of several elements. Typically, the ingredients in such paints include materials which are liquid and materials which are solid particulate matter, suspended in the liquid components of the paint. As a result of the combination of such a variety of elements within typical paint mixtures there is a tendency, in even the finest quality paints, for lumps or collections of partially cured or solidified particulate matter to form within the paint during processing and storage time.

Painters often contend with inconsistencies, foreign materials and partially solidified lumps or other variations of texture in the paint which they apply. Particularly those who utilize paint spraying devices. The presence of such inconsistencies, foreign materials, and lumps is a nuisance.

Paint sprayers offer a substantial increase in speed and quality of painting attainable by painters, the spray guns themselves contain relatively small paint passages and nozzle orifices and are therefore extremely sensitive to being clogged by particles, foreign matter, and lumps within the paint. In most situations, a clogged gun must be immediately removed from the system and completely or partially disassembled or otherwise cleaned and freed of the clogging material before the painting operation may be resumed. As can be imagined, the need to frequently interrupt the painting process to clean a clogged spray gun or associated spraying apparatus is time consuming and costly to the painters.

As a result of the problems caused by clogged spray guns, the practitioners in the painting art have adopted the use of various paint straining devices with the object of preventing clogging particulate matter and lumps from reaching the sensitive spray gun. One such device is a paint strainer. A paint strainer is a disposable painting product typically cone shaped and usually designed with a fine mesh material for removing all impurities from the paint. A stand is often used in conjunction with the paint strainer. The stand holds the paint strainer situated directly over the vessel paint will be poured into. Paint is poured through the paint strainer to filter out any lumps or particles.

While this method of straining does remove the majority of particulate matter and lumps from the paint to be used, its use is time consuming. It takes a considerable amount of time for paint to flow through a paint strainer. And the process of straining paint must be done each time prior to painting. There remains therefore a need in the art for a quicker means to filter paint through a paint strainer which avoids the foregoing described problems.

DESCRIPTION OF DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DESCRIPTION

In the summary above and in this Detailed Description, and the Claims below, and in the accompanying drawings, reference is made to particular features (including method steps) of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises," and grammatical equivalents thereof are used herein to mean that other components, ingredients, steps, among others, are optionally present. For example, an article "comprising" (or "which comprises") components A, B, and C can consist of (i.e., contain only) components A, B, and C, or can contain not only components A, B, and C but also contain one or more other components.

The following description provides preferred exemplary embodiments only, and is not intended to limit the scope, applicability, or configuration of the invention. The following description of the preferred exemplary embodiment will provide those skilled in the art with an enabling description for implementing a preferred exemplary embodiment of the invention. It being understood that various changes may be made in the function and arrangement of elements without departing from the scope of the invention as set forth in the claims.

Figure 1:
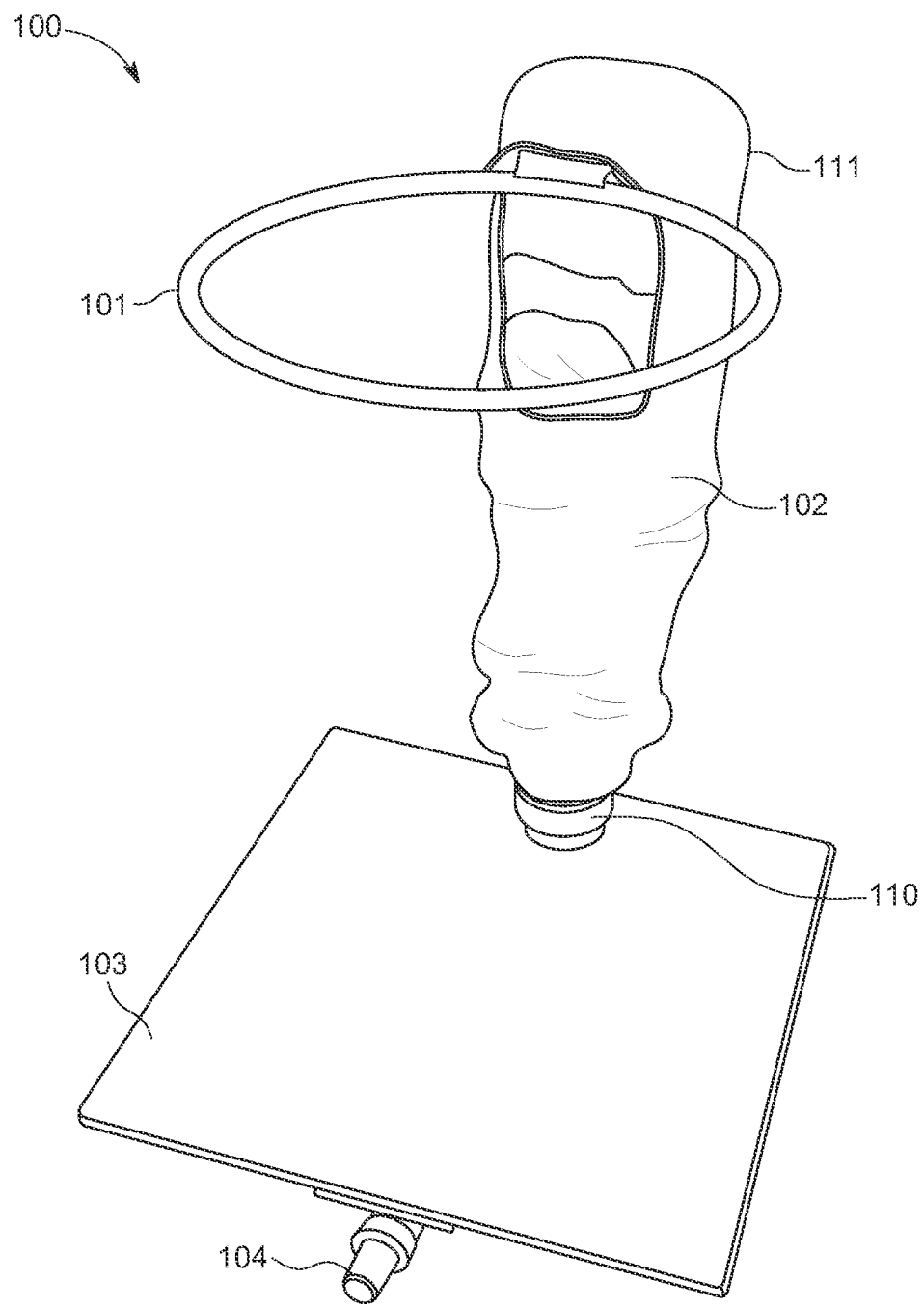
FIG. 1 is a perspective view of an exemplary embodiment of a vibrating paint strainer stand in accordance with an illustrative embodiment.
Figure 6:
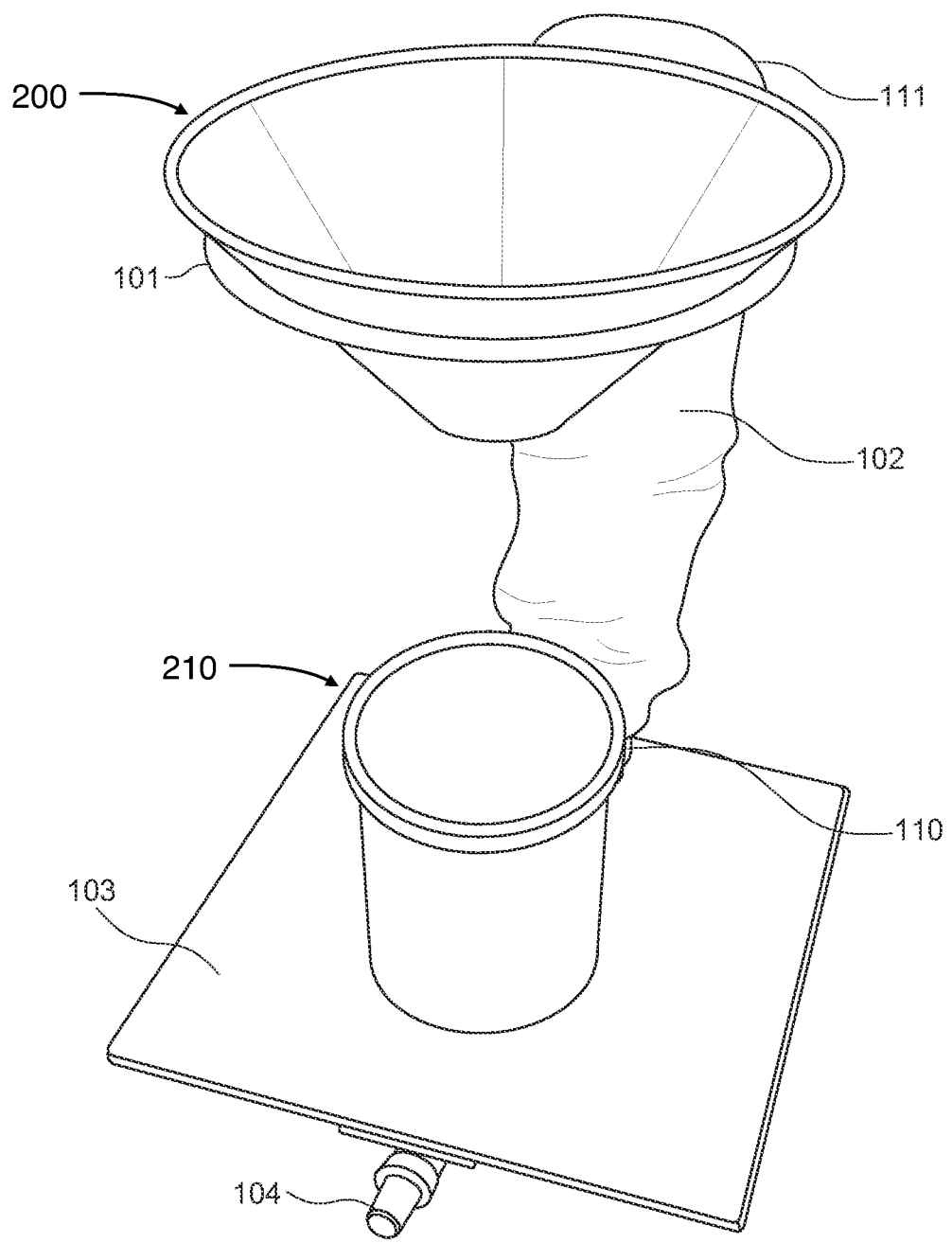
FIG. 6 is a view of vibrating paint strainer stand in use.

The present description includes one or more non-limiting embodiments for a vibrating paint strainer stand. In one or more non-limiting embodiments, the presently disclosed device enables the user to effectuate the flow of paint through a paint strainer by vibrating the paint strainer stand. Referring now to FIG. 1, FIG. 1 is a perspective view showing a non-limiting embodiment of the presently disclosed vibrating paint strainer stand 100. The vibrating paint strainer stand 100 is comprised of a base 103 made of a rigid material, such as steel, or any other hardened metal or composite thereof, that forms the support for which additional elements of the device are attached such as a paint container 210 or receptacle to receive paint from a paint strainer. In one or more non-limiting embodiments, the neck 102 is mechanically attached to the base 103 in a vertical orientation using a rubber bushing 110, or any other similar dynamic connection. The neck 102 is made of a rigid material, such as steel, or any other hardened material or composite thereof. In one or more non-limiting embodiments, the paint strainer holder 101 is attached to the neck 102 at the end opposite the connection between the neck 102 and base 103. The paint strainer holder 101 is positioned horizontal with the base 103, and is shaped to accept and hold a paint strainer 200 whereby then a paint container 210 positioned on base 103 may receive paint from paint strainer 200 as illustrated in FIG. 6. The paint strainer holder 101 is made of a rigid material, such as steel, or any other hardened material or composite thereof.

Figure 2:
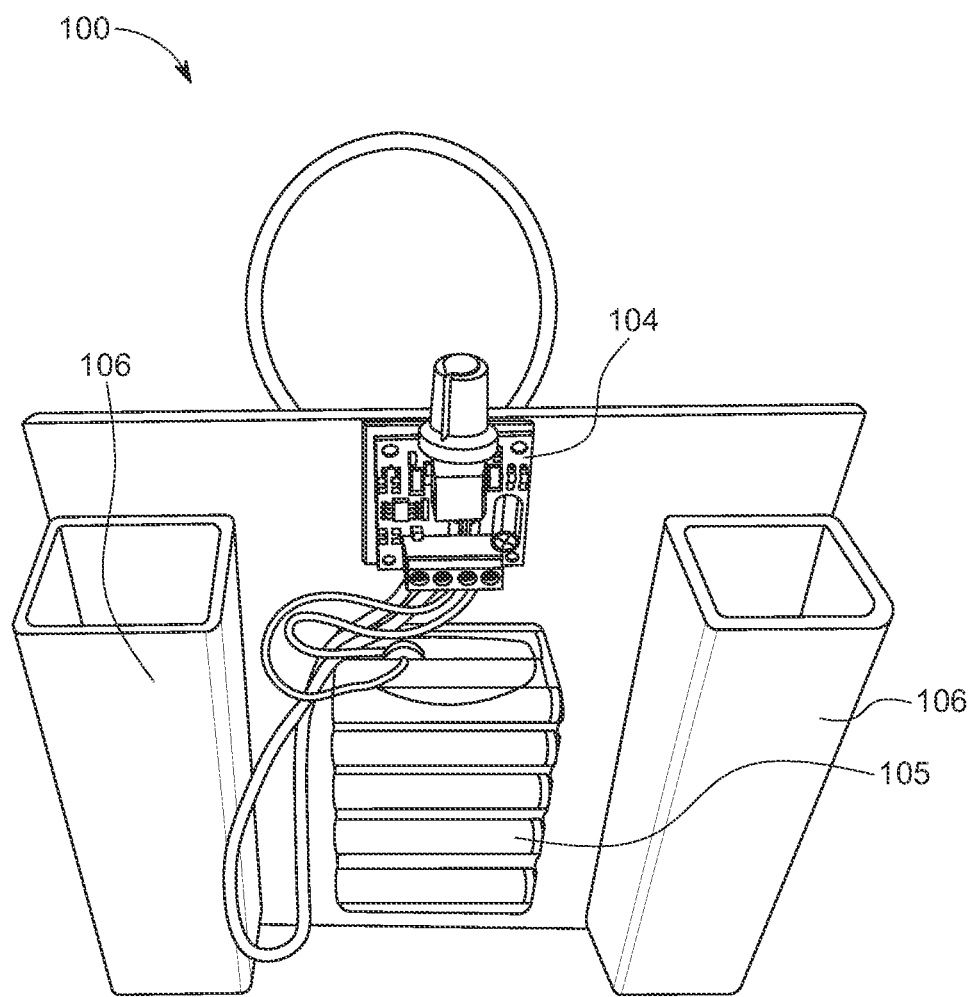
FIG. 2 is a bottom view of an exemplary embodiment of a vibrating paint strainer stand in accordance with an illustrative embodiment.

Referring now to FIG. 2, FIG. 2 is a bottom view showing a non-limiting embodiment of the presently disclosed vibrating paint strainer stand 100 further comprised of an On/Off switch 104, a vibration motor power source 105, and at least one base support 106. In one or more non-limiting embodiments, the base supports are made of a rigid material, such as steel, or any other hardened material or composite thereof. The base supports 106 are attached to the base 103 on the side opposite the neck 102 and are positioned around the On/Off switch 104 and vibration motor power source 105.

In one or more non-limiting embodiments, an On/Off switch 104 is attached to the base 103 on the side opposite the neck 102 (attachment not shown). The On/Off switch 104 is electrically connected to the vibration motors 107 (connection not shown) and the vibration motor power source 105 to control the electrical current flow between the vibration motor power source 105 and the vibration motors 107. In one or more non-limiting embodiments, the vibration motor power source 105 is comprised of batteries, or any other similar means of providing an electrical current. The vibration motor power source 105 is attached to the base 103 on the side opposite the neck 102 (attachment not shown) and is electrically connected to the On/Off switch 104.

Figure 3:
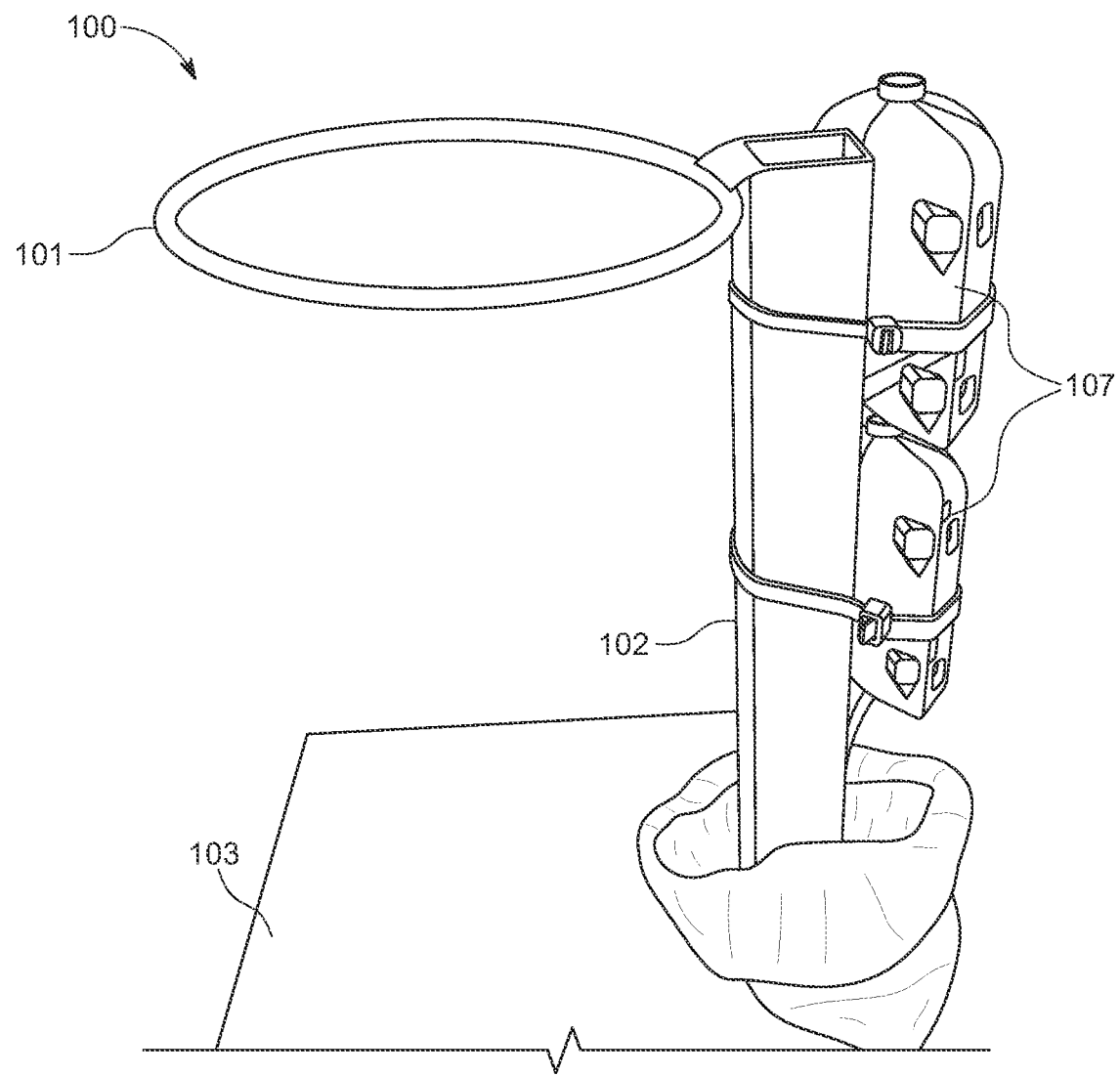
FIG. 3 is a left-side view of an exemplary embodiment of a vibrating paint strainer stand in accordance with an illustrative embodiment.

Referring now to FIG. 3, FIG. 3 is a left-side view showing a non-limiting embodiment of the presently disclosed vibrating paint strainer stand 100. In one or more non-limiting embodiments, at least one vibration motor 107 is attached to the neck 102 using an attachment means such as a zip-tie or any other similar type attachment means such as hinges, latches, or adhesive. The vibration motors 107 are positioned above the rubber bushings 110 between the base 103 and paint strainer holder 101.

Figure 4:
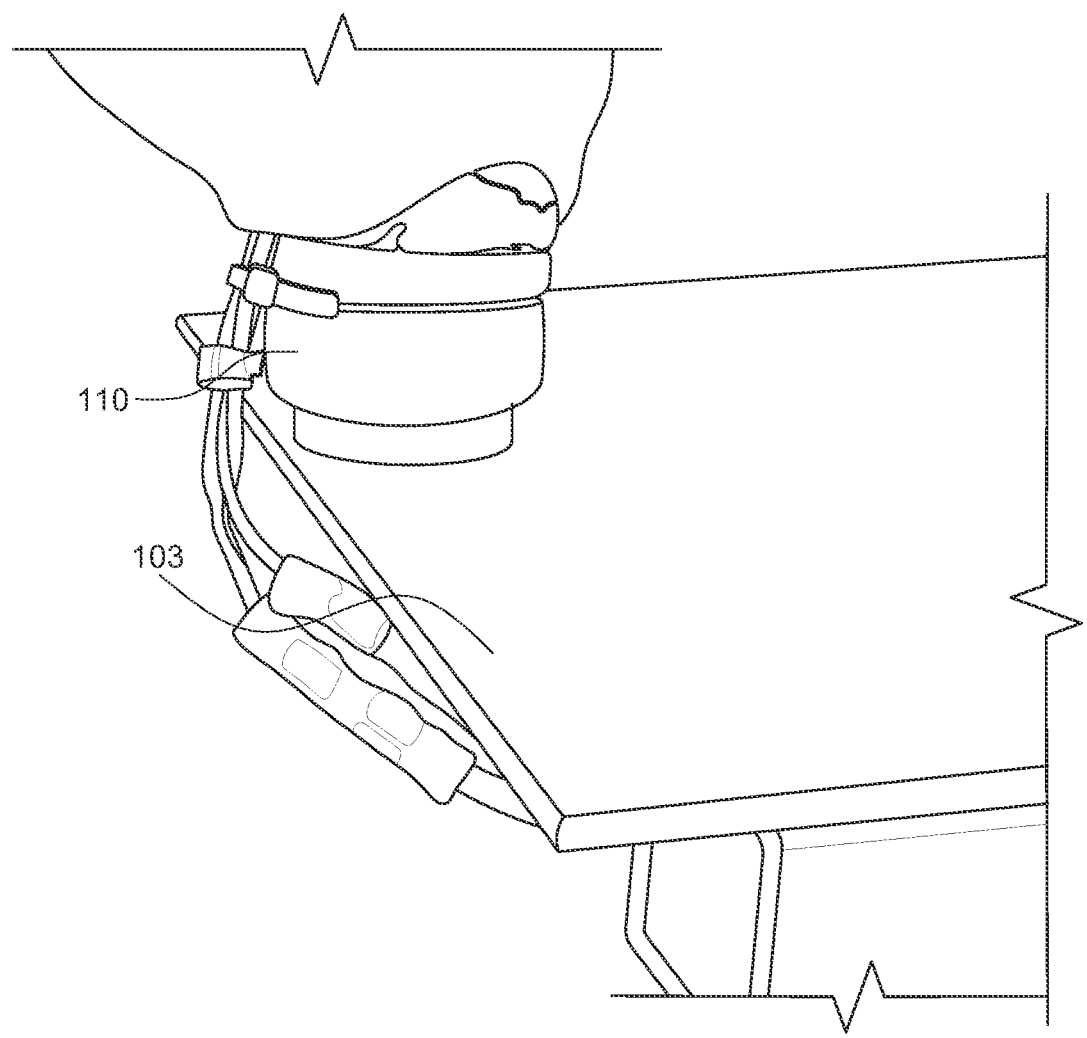
FIG. 4 is a right-side view of an exemplary embodiment of a vibrating paint strainer stand in accordance with an illustrative embodiment.

Referring now to FIG. 4, FIG. 4 is a right-side view showing a non-limiting embodiment of the presently disclosed vibrating paint strainer stand 100. In one or more non-limiting embodiments, a rubber bushing 110 or similar dynamic connection, connects the neck 102 with the base 103.

Figure 5:
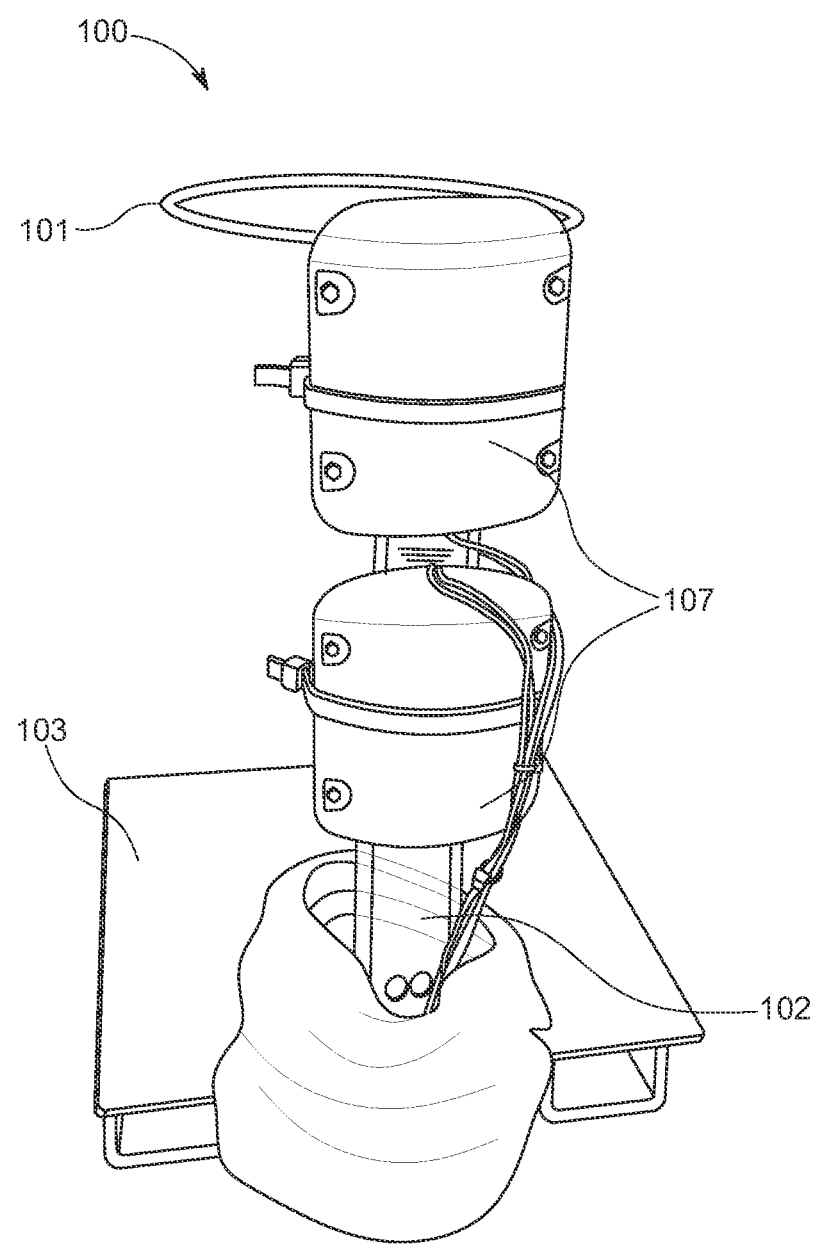
FIG. 5 is a back view of an exemplary embodiment of a vibrating paint strainer stand in accordance with an illustrative embodiment.

Referring now to FIG. 5, FIG. 5 is back view showing a non-limiting embodiment of the presently disclosed vibrating paint strainer stand 100. In one or more non-limiting embodiments, at least one vibration motor 107 is attached to the neck 102 using an attachment means such as a zip-tie or any other similar type attachment means. The vibration motors 107 are positioned above the rubber bushings 110 between the base 103 and neck 102.

In one or more non-limiting embodiments, a protective cover 111 as shown in FIG. 1, is placed over the neck 102, vibration motor 107 and rubber bushing 110. The protective cover 111 is comprised of a dust resistant material meant to prevent foreign matter from interacting with the vibration motor 107 and bushing 110.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention according to one or more embodiments described in the present description may be practiced with modification and alteration within the spirit and scope of the appended claims. Thus, the description is to be regarded as illustrative instead of restrictive of the present invention.

What is claimed is:

1. A vibrating paint strainer stand, the vibrating paint strainer stand comprising:
   a base having an upper flat surface for a paint container to rest upon, a neck attached to the base at a rear of the base wherein the neck is an elongated member extending upward from at or near a rear surface of the base, a paint strainer holder attached to the neck, and one or more vibration motors directly attached to the neck, wherein the paint strainer holder extends out forward from the neck, wherein the paint strainer holder is in a shape of a ring that is parallel to and directly positioned over the base, wherein the paint strainer holder is configured to hold a paint strainer in an upright position wherein a top area of the paint strainer rests upon the ring wherein a bottom area extends down past the ring further comprising a dust cover positioned over the neck and the one or more vibration motors, wherein the neck is attached to the base by a rubber bushing.

2. The vibrating paint strainer stand according to claim 1, further comprising a switch to control the one or more vibration motors.

3. The vibrating paint strainer stand according to claim 1, wherein one or more supports are positioned under the base.

4. A vibrating paint strainer stand, the vibrating paint strainer stand comprising:
   a paint strainer holder configured to hold a paint strainer and one or more vibration motors to provide vibration to the paint strainer positioned in the paint strainer holder above a paint container, wherein the vibrating paint strainer stand has a neck attached to a base at a rear of the base wherein the neck is an elongated member extending upward from at or near a rear surface of the base, wherein the paint strainer holder extends out forward from a neck, wherein the paint strainer holder is in a shape of a ring that is parallel to and directly positioned over the base, wherein the paint strainer holder is configured to hold the paint strainer in an upright position wherein a top area of the paint strainer rests upon the ring wherein a bottom area extends down from the ring, wherein the one or more vibration motors are connected to the neck further comprising a dust cover positioned over the neck and the one or more vibration motors, wherein the neck is attached to the base by a rubber bushing and the one or more vibration motors are directly attached to the neck.

5. The vibrating paint strainer stand according to claim 4, further comprising a switch to control the one or more vibration motors.

6. The vibrating paint strainer stand according to claim 4, wherein a power source is positioned inside of a supporting structure of the base.

7. The vibrating paint strainer stand according to claim 4, the base having a surface and two base supports positioned under the surface.

8. The vibrating paint strainer stand according to claim 7, wherein circuitry components and power source positioned under the base and between the two base supports.

* * * * *